(12) United States Patent
Hackborn (10) Patent No.: US 8,832,606 B2
(45) Date of Patent: Sep. 9, 2014

(54) WALLPAPER ASSIGNMENT FOR MULTI-USER MOBILE DEVICE

(71) Applicant: Google Inc., Mountain View, CA (US)

(72) Inventor: Dianne Kyra Hackborn, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/038,553

(22) Filed: Sep. 26, 2013

(65) Prior Publication Data

US 2014/0115488 A1   Apr. 24, 2014

Related U.S. Application Data

(60) Provisional application No. 61/716,441, filed on Oct. 19, 2012, provisional application No. 61/788,660, filed on Mar. 15, 2013.

(51) Int. Cl.
*G06F 17/00*     (2006.01)
*G06F 3/0482*    (2013.01)

(52) U.S. Cl.
CPC .................................. *G06F 3/0482* (2013.01)
USPC ............................ 715/864; 715/750; 715/764

(58) Field of Classification Search
None
See application file for complete search history.

(56) References Cited

U.S. PATENT DOCUMENTS

| | | | | |
|---|---|---|---|---|
| 6,101,529 | A  * | 8/2000  | Chrabaszcz | 709/203 |
| 2008/0120152 | A1 * | 5/2008  | McCrea | 705/7 |
| 2009/0158424 | A1 * | 6/2009  | Yang | 726/19 |
| 2009/0259968 | A1 * | 10/2009 | Hsieh et al. | 715/808 |
| 2012/0259707 | A1 * | 10/2012 | Thielke et al. | 705/14.64 |
| 2012/0303476 | A1 * | 11/2012 | Krzyzanowski et al. | 705/26.5 |
| 2013/0069962 | A1 * | 3/2013  | Nealer et al. | 345/522 |

* cited by examiner

*Primary Examiner* — Stephen Hong
*Assistant Examiner* — Keith Bloomquist
(74) *Attorney, Agent, or Firm* — Shumaker & Sieffert, P.A.

(57) ABSTRACT

Techniques are described for providing a unique wallpaper for a new user profile on a graphical user interface of a computing device. An example method includes initiating, by a computing device, a new user profile setup process to create a user profile at the computing device, the computing device having at least one other existing user profile. The method further includes automatically selecting, by the computing device, a wallpaper from a set of two or more wallpapers, wherein each wallpaper of the set of two or more wallpapers comprises a different graphical image, wherein the wallpaper is not associated with any of the other user profiles of the computing device. The method also includes automatically associating the wallpaper with the new user profile, such that the computing device displays the wallpaper in response to an attempt to access the user profile of the computing device.

20 Claims, 5 Drawing Sheets

WALLPAPER ASSIGNMENT FOR MULTI-USER MOBILE DEVICE

This application claims the benefit of U.S. Provisional Application No. 61/716,441, filed Oct. 19, 2012, and U.S. Provisional Application No. 61/788,660, filed Mar. 15, 2013, the entire content of each of which are incorporated by reference herein.

BACKGROUND

Mobile computing devices, such as mobile phones and tablet computers, are becoming increasingly powerful and ubiquitous in use. Software applications for these computerized devices are becoming widely available and offer extensive and ever increasing functionality. As a result, mobile computing devices may be capable of processing a wide variety and potentially sensitive or personal information (e.g., documents, e-mails, and pictures) for display (e.g., on a screen) or otherwise for output to a user.

Certain mobile computing devices can operate in a limited access state that may prevent an unauthorized user from accessing applications and information stored within the computing device, thereby effectively "locking" the computing device. For example, some mobile computing devices may require a user to provide a specific input to lock and/or unlock the device. While the locking techniques can provide security for information contained within the device as well as protection from accidental inputs, once the device is unlocked, the computing device may provide access to the applications and information stored within the computing device to any user who provides the specific input to unlock the device. When the computing device is configured with multiple user profiles or accounts, it may be difficult to determine which user profile is being accessed at an unlock screen.

SUMMARY

In one example, a method includes initiating, by a computing device, a new user profile setup process to create a new user profile at the computing device, the computing device having at least one other existing user profile. Prior to the computing device completing the new user profile setup process, the method further comprises automatically selecting, by the computing device, a wallpaper from a set of two or more wallpapers, wherein each wallpaper of the set of two or more wallpapers comprises a different graphical image, and, wherein the wallpaper is not associated with any of the other existing user profiles of the computing device, and automatically associating the wallpaper with the new user profile, such that the computing device displays the wallpaper in response to an attempt to access the user profile of the computing device.

In another example, a computing device includes one or more processors configured to cause the computing device to initiate, by the computing device, a new user profile setup process to create a new user profile at the computing device, the computing device having at least one other existing user profile. Prior to the computing device completing the new user profile setup process, the one or more processors are configured to cause the computing device to automatically select a wallpaper from a set of two or more wallpapers, wherein each wallpaper of the set of two or more wallpapers comprises a different graphical image, wherein the wallpaper is not associated with any of the other existing user profiles of the computing device. The one or more processors are further configured to cause the computing device to automatically associate the wallpaper with the new user profile, such that the computing device displays the wallpaper in response to an attempt to access the user profile of the computing device.

In another example, a computer-readable storage medium is encoded with instructions that, when executed, cause one or more processors of a computing device to initiate a new user profile setup process to create a new user profile at the computing device, the computing device having at least one other existing user profile. Prior to the computing device completing the new user profile setup process, the instructions, when executed, further cause one or more processors of the computing device to automatically select a wallpaper from a set of two or more wallpapers, wherein each wallpaper of the set of two or more wallpapers comprises a different graphical image, wherein the wallpaper is not associated with any of the other existing user profiles of the computing device and automatically associate the wallpaper with the new user profile, such that the computing device displays the wallpaper in response to an attempt to access the user profile of the computing device.

The details of one or more examples of the disclosure are set forth in the accompanying drawings and the description below. Other features, objects, and advantages will be apparent from the description and drawings, and from the claims.

DETAILED DESCRIPTION

In general, this disclosure describes techniques for enabling and supporting multiple user profiles on a mobile computing device. Typically, once a user unlocks a mobile computing device, the mobile computing device provides access to the applications and information stored at the mobile computing device to any user who provides the specific input to unlock the device. For example, if two different users share access to the same mobile computing device, each user is typically able to access any information or execute any application stored on the computing device or otherwise accessible to the computing device. For example, if a first user enters a username and password for an email account, a second user who uses the device is able to launch the email application and access the first user's email account and associated emails. As another example, the second user may access and delete information, applications, etc. installed and/or configured by the first user.

In accordance with techniques of this disclosure, a mobile computing device may be configured with multiple different user profiles or accounts, each user profile being separate from the other user profiles such that a user associated with a first user profile is prevented from gaining access to other users' profiles without providing proper authentication information for the other user profiles. As one example, a first user profile may be associated with a user's personal information and a first set of installed applications while a second user profile may be associated a user's work information and a second, potentially overlapping, set of applications. By providing different user profiles for the user's work and personal information and applications, an employer may enforce various security measures within the work profile to secure the work-related information and applications while allowing the user to configure the mobile computing device to apply a different set of security measures to the personal information and applications.

In other examples, a user may share the mobile computing device with another user for a limited period of time (e.g., a guest user). Rather than permitting the guest user to access the user's information and applications, the mobile computing device may be configured with a guest user profile that provides a configurable amount of access (e.g., limited access, full access, etc.) to the applications and information of the computing device. Responsive to the guest user no longer being the active user profile (e.g., logging out, logging into another user profile, etc.), the mobile computing device may be configured to automatically remove all application and user data stored at and/or generated by the mobile computing device while the guest user profile was the active user profile. Removing this application and user data may reduce the amount of information stored at the mobile computing device.

In some instances, it may be difficult for a user to determine which user profile is currently the active user profile for a given mobile computing devices. Techniques of this disclosure may enable a mobile computing device to facilitate identification of a currently active user profile by, for example, assigning a unique wallpaper to each user profile responsive to the creation of each user profile. In some examples, the wallpaper of the currently active user profile is displayed at a lock screen of the computing device. By associating a unique wallpaper with each user profile and displaying the wallpaper at the lock screen, techniques of this disclosure may enable a user to determine the active user profile by causing the screen of the mobile computing device to turn on and display the lock screen rather than requiring the user to go through an authentication process before the user can determine which is the active user profile (e.g., by entering a passcode or other authentication information).

Figure 1:
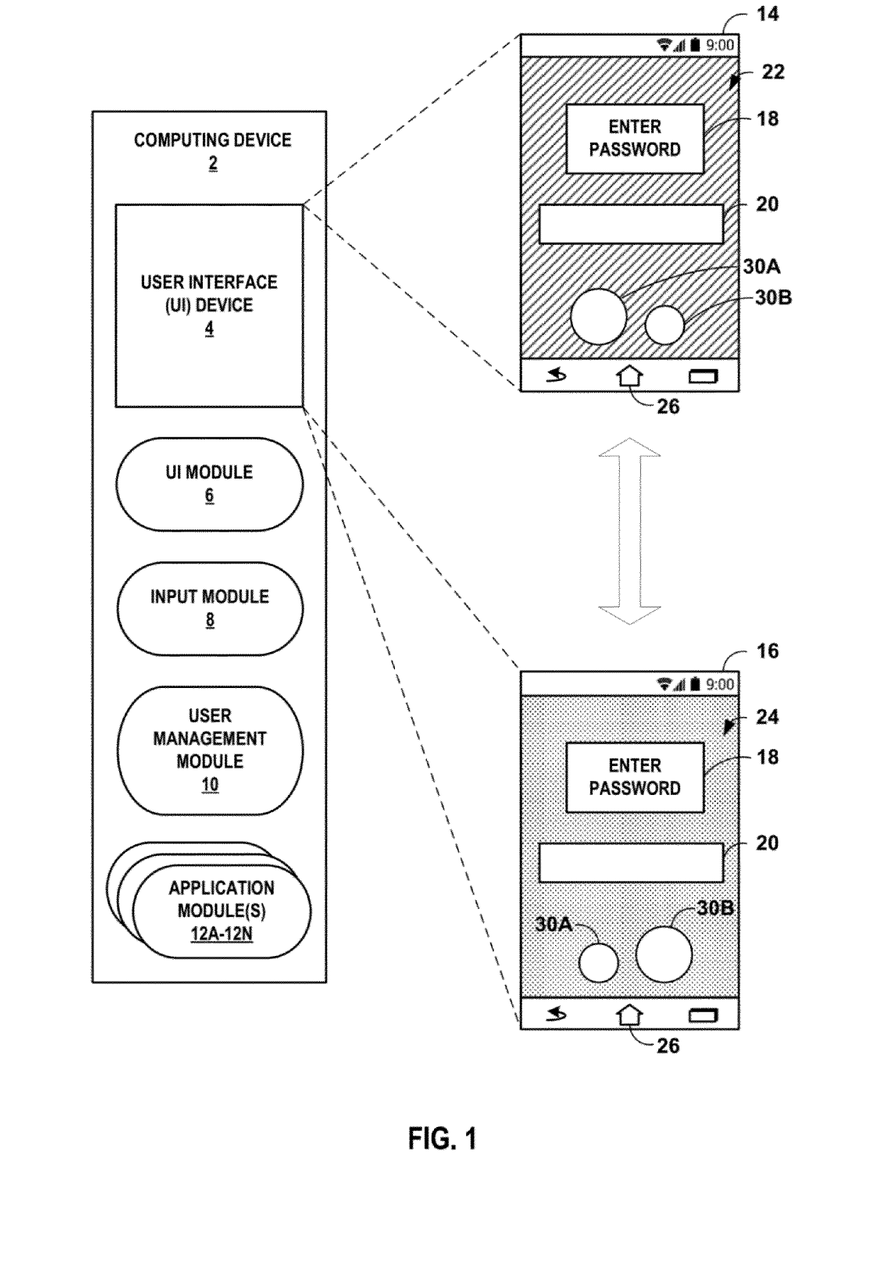
FIG. 1 is a conceptual diagram illustrating an example mobile computing device and graphical user interfaces (GUIs) for providing a unique wallpaper for a new user profile of the mobile computing device, in accordance with one or more aspects of the present disclosure.

FIG. 1 is a conceptual diagram illustrating an example computing device and graphical user interfaces (GUIs) for providing a unique wallpaper for a new user profile of the mobile computing device, in accordance with one or more aspects of the present disclosure. Examples of computing device 2 may include, but are not limited to, portable or mobile computing devices such as mobile phones (including smart phones), laptop computers, tablet computers, cameras, personal digital assistants (PDAs), and so on. In other examples, computing device 2 may include other types of computing devices, such as smart television platforms, desktop computers, servers, mainframes, and so on.

As shown in the example of FIG. 1, computing device 2 may be a tablet computer. In the example of FIG. 1, computing device 2 includes a user interface (UI) device 4, a UI module 6, an input module 8, a user management module 10, and one or more application modules 12A-12N (collectively, "application modules 12"). Other examples of computing device 2 that implement techniques of this disclosure may include additional components not shown in FIG. 1.

UI device 4 may be configured to receive tactile, audio, or visual input. UI device 4, as shown in FIG. 1, may include a touch-sensitive and/or presence-sensitive display or any other type of device for receiving input. UI device 4 may output content such as graphical user interface (GUI) 12 for display. In the example of FIG. 1, UI device 4 may be a presence-sensitive display that can display a graphical user interface and receive input from a user using capacitive, inductive, and/or optical detection at or near the presence-sensitive display.

As shown in FIG. 1, computing device 2 may include UI module 6. UI module 6 may perform one or more functions to receive input, such as user input or network data, and send such input to other components associated with computing device 2, such as input module 8. For example, UI module 6 may determine a gesture performed by the user at UI device 4, and UI module 6 may in turn send gesture data based on the determination to input module 8. UI module 6 may also receive data from components associated with computing device 2, such as input module 8. Using the data, UI module 6 may cause other components associated with computing device 2, such as UI device 4, to provide output based on the data. For instance, UI module 6 may receive data from input module 8 that causes UI device 4 to display information in text entry field 14 of GUI 12.

UI module 6 may be implemented in various ways. For example, UI module 6 may be implemented as a downloadable or pre-installed application or "app." In another example, UI module 6 may be implemented as part of a hardware unit of computing device 2. In another example, UI module 6 may be implemented as part of an operating system of computing device 2.

In the example of FIG. 1, computing device 2 includes input module 8. Input module 8 may include functionality to perform any variety of operations on computing device 2. For instance, input module 8 may include functionality to determine gesture, keyboard, or other user inputs in accordance with the techniques described herein. Input module 8 may be implemented in various ways. For example, input module 8 may be implemented as a downloadable or pre-installed application or "app." In another example, input module 8 may be implemented as part of a hardware unit of computing device 2. In another example, input module 8 may be implemented as part of an operating system of computing device 2.

Input module 8 may receive data from components associated with computing device 2, such as UI module 6. For instance, input module 8 may receive gesture data from UI module 6 that causes input module 8 to determine one or more actions to perform from the gesture data. Input module 8 may also send data to components associated with computing device 2, such as UI module 6. For instance, input module 8 may send text determined from the gesture data to UI module 6 that causes UI device 4 to display GUIs 14 and 16.

User management module 10 may manage one or more user profiles configured at computing device 2. As used herein, the terms "user profiles" and "user accounts" are used interchangeably. For example, user management module 10 may create, modify, or delete user profiles configured at computing device 2, e.g., responsive to user input received by input module 8. In some instances, user management module 10 may control access to information stored at computing device 2 and associated with various user profiles configured at computing device 2 by, for example, authenticating user input received by user interface device 4 against stored authentication information associated with a particular user profile. User management module 10 may, upon determining that the user input matches the stored authentication information, grant access to the user profile and associated computing resources of computing device 2, such as applications associated with one or more of application modules 12. User management module 10 may deny access to the user profile and associated computing resources when the user input does not match the stored authentication information.

As shown in FIG. 1, computing device 2 includes one or more application modules 12A-12N (collectively, "application modules 12"). Application modules 12 may include functionality to perform various operations on computing device 2. For instance, application modules 12 may include functionality to generate and update a stock of different wallpaper options stored at computing device 2. In some examples, application modules 12 may receive input from user management module 10.

As shown in FIG. 1, GUIs 14 and 16 may be user interfaces generated by UI module 6 that allows a user to interact with computing device 2. GUIs 14 and 16 may include graphical content. Graphical content, generally, may include text, images, a group of moving images, etc.

As shown in FIG. 1, GUIs 14 and 16 both include one example of a lock screen that can receive user input to unlock computing device 2 and permit access to a respective user profile and computing resources associated with the respective user profile. The different lock screen GUIs 14 and 16 shown in the example of FIG. 1 are associated with different user profiles created on computing device 2, and UI module 6 generates a corresponding one of lock screen GUIs 14, 16 based on a currently selected one of the different user profiles. GUIs 14 and 16 each display a message 18 providing information indicating that computing device 2 is locked and a password or other data should be entered to unlock computing device 2. GUIs 14 and 16 each display a field 20 that can be used to receive user input for unlocking computing device 2, such as a password.

Each of GUIs 14 and 16 may be associated with a different user profile that has been previously created on computing device 2. For example, GUI 14 is associated with a first user profile and GUI 16 is associated with a second, different user profile. A wallpaper 22 displayed on GUI 14 is associated with the first user profile. In one example, a wallpaper is any graphical image that may be used as a background image at a display screen. In the example of FIG. 1, the wallpaper 22 is displayed as a background region of GUI 14.

In the example of FIG. 1, GUIs 14, 16 also include a set of profile identification elements 30A and 30B ("profile identification elements 30"), which are each associated with a different user profile previously created on computing device 2. Profile identification elements 30A and/or 30B may be graphical elements that correspond to different user profiles and may include various combinations of text and images that identify the corresponding user profiles. In some examples, profile identification elements 30 may each be displayed as a different color, and/or may include text specifying a user name associated with each respective user profile. In some examples, profile identification elements 30 may include a picture of the respective user associated with the user profiles. Although shown for purposes of example with two profile identification elements 30, greater than two profile identification elements may be present when greater than two user profiles have been created on computing device 2.

Profile identification elements 30 may be used for navigating between different lock screens associated with the different user profiles. In the example of FIG. 1, profile identification element 30A is associated with the first user profile and is displayed as being larger in size than profile identification element 30B at GUI 14 when the first user profile is the currently selected account and when wallpaper 22 is displayed. Profile identification element 30B is associated with the second user profile, and is displayed as being larger in size than profile identification element 30A at GUI 16 when the second user profile is the currently selected account and when wallpaper 24 is displayed. Relative size or other characteristics of profile identification elements 30 may provide a visual indicator of which of profile identification elements 30 is currently selected. For instance, profile identification elements 30 may visually indicate the currently-selected profile identification element by discoloring, bolding, blurring, highlighting, animating, and/or italicizing the currently-selected profile identification element and/or the non-selected profile identification elements. For ease of explanation, this disclosure may refer to the user profile that corresponds to the currently selected profile identification element as the "currently selected user profile."

In the example of GUI 14, the first user profile is currently selected on computing device 2. In one example, the first user profile may have been previously logged into computing device 2 and no other user profile has been logged in to computing device 2 since the first user profile was last logged in. When the first user profile is logged in to computing device 2, computing device 2 enters a mode associated with the first user profile. In the mode associated with the first user profile, a set of functionalities, such as applications, widgets, or other features, are enabled at computing device 2.

In one example, the first user profile may have timed out or otherwise become locked. For example, computing device 2 may not have received any input within a selected time period. Without having receiving any input within the time period, computing device 2, for security or confidentiality reasons, may disable certain functionalities that are otherwise available when the first user profile is logged into computing device 2, and revert to the locked state, and lock screen shown at GUI 14. Alternatively, computing device 2 may enter the locked state in response to receiving input from the user that actively places computing device 2 in the locked state, such as detecting that a locking button or graphical element has been activated. In some cases, upon entering the locked state, UI device 4 of computing device 2 may turn off the display screen until further user input is detected.

After entering a locked state, when computing device 2 subsequently detects user input, computing device 2 may output a lock screen GUI 14 of UI device 4. In the example of FIG. 1, the screen GUI 14 includes a background portion of wallpaper 22 associated with the previously selected user profile, e.g., the first user profile. Displaying wallpaper 22 at the lock screen GUI 14 may enable easy identification of which user profile will be accessed upon correctly entering user credentials in field 20. If the current user does not wish to log into the user profile associated with the currently displayed wallpaper, for example, wallpaper 22, the user can select icon 30B to choose a different user profile than the currently selected user profile.

In some examples, computing device 2 may display a lock screen GUI associated with a currently selected user profile even when the user profile is not the user profile having been most recently logged in. For example, computing device 2 may display a lock screen associated with a user profile for which the most recent login attempt occurred, or that was most recently selected even if no attempt was made to log in to the user profile.

Wallpaper 24 is associated with the second user profile and output, by UI device 4, as a background of GUI 16. As shown in FIG. 1, wallpaper 24 is different from wallpaper 22. For example, wallpaper 24 is visually distinct from wallpaper 22. That is, a typical sighted user should be able to distinguish between wallpaper 22 and wallpaper 24. For example, wallpapers 22, 24 may include different colors and/or patterns. Because each of wallpapers 22 and 24 are unique, users of computing device 2 can determine which user profile is currently selected, and which user profile will be accessed upon correctly entering user credentials in field 20.

When the user indicates a selection of a user profile, UI module 6 may receive an indication of a user input at UI device 4. UI module 6 may send data that represents the user input to user management module 10. For example, where the user indicates a selection of a user profile by performing a gesture at UI device 4, UI module 6 may send one or more coordinate pairs representing the user input to user management module 10.

In response to receiving data representing the user input from UI module 6, user management module 10 may determine which user profile corresponds with the user input. In some examples, user management module 10 may determine a corresponding user profile by comparing one or more coordinate pairs received from UI module 6 with the coordinates at which profile identification elements 30A and 30B are located within lock screen GUIs 14 and 16. In the example of FIG. 1, user management module 10 may determine that the user input corresponds to profile identification element 30B which identifies a second user profile.

In response to determining which user profile corresponds with the user input, user management module 10 may cause UI module 6 to output, for display at UI device 4, an updated version of the lock screen GUI. The updated version of lock screen GUI may include the wallpaper associated with the determined user profile. In the example of FIG. 1, user management module 10 may cause UI module 6 to output, for display at UI device 4, a version of lock screen GUI 16 that includes wallpaper 24 associated with the second user profile.

In this way, computing device 2 may output, for display at UI device 4, a lock screen GUI 14, 16 and may selectively control the wallpaper rendered within lock screen GUI 14, 16 based on which user profile is currently selected. For example, lock screen GUI 14, 16 may include a plurality of graphical elements, e.g., a first graphical element and a second graphical element. The first graphical element may comprise information that identifies a first user profile of computing device 2. The second graphical element may comprise information that identifies a second user profile of computing device 2. In addition, computing device 2 may receive an indication of a first user input. The first user input may correspond to a user selection of the first graphical element, such as profile identification element 30A. In some examples, the first user input includes a tapping gesture at a region of UI device 4 that displays the first graphical element. In response to receiving the indication of the first user input, computing device 2 may output, for display at UI device 4, lock screen GUI 14 such that lock screen GUI 14 includes wallpaper 22 associated with the first user profile.

Computing device 2 may also receive an indication of a second user input. The second user input may correspond to a user selection of the second graphical element, such as profile identification element 30B. In some examples, the second user input includes a tapping gesture at a region of UI device 4 that displays the second graphical element. In response to receiving the indication of the second user input, computing device 2 may output, for display at UI device 4, lock screen GUI 16 such that, in place of the wallpaper 22 associated with the first user profile, lock screen GUI 16 includes the wallpaper 24 associated with the second user profile. In this way, computing device 2 may dynamically construct and output, for display at UI device 4, lock screen GUI 14 or 16 based on which user profile is the currently-selected user profile, and may seamlessly switch between lock screens (e.g., lock screens 14, 16) having different wallpapers for different user profiles.

By associating a unique wallpaper with each user profile and displaying the wallpaper at the lock screen, techniques of this disclosure may enable a user to determine the currently selected user profile by causing the screen of the mobile computing device to turn on and display the lock screen rather than requiring the user to go through an authentication process before the user can determine which is the currently selected user profile (e.g., by entering a passcode or other authentication information). In this manner, associating different wallpaper with each user profile and displaying the wallpaper associated with the currently selected user profile at the lock screen can provide a more convenient experience for the user.

Figure 2:
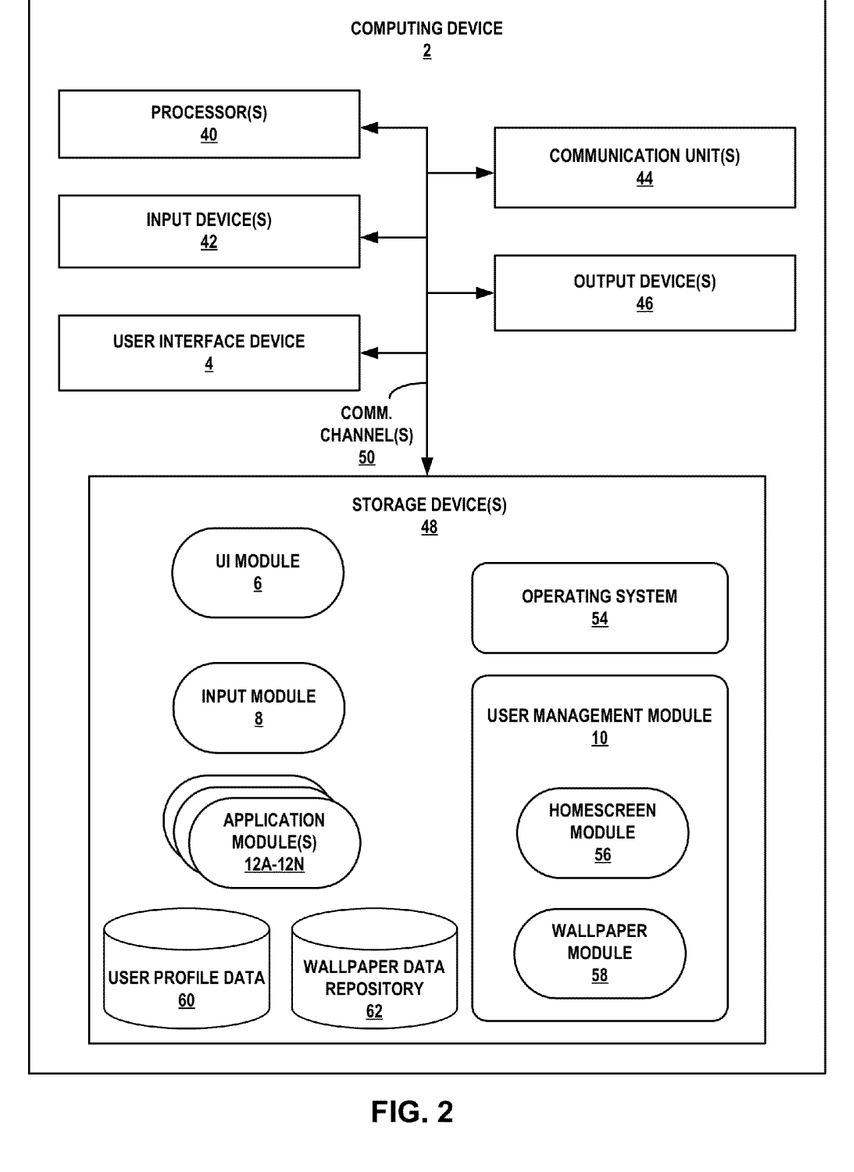
FIG. 2 is a block diagram illustrating further details of one example of a computing device shown in FIG. 1, in accordance with one or more aspects of the present disclosure.

FIG. 2 is a block diagram illustrating further details of one example of a computing device 2 shown in FIG. 1. FIG. 2 illustrates only one particular example of computing device 2, and many other examples of computing device 2 may be used in other instances. Moreover, although shown in FIGS. 1 and 2 as a stand-alone computing device 2 for purposes of example, a computing device may be any set of components or system that includes one or more processors 40 or other suitable computing environment for executing software instructions.

As shown in the specific example of FIG. 2, computing device 10 includes a computing system for providing an execution environment for executable software instructions. In this example, computing device 2 comprises user interface device 4, one or more processors 40, one or more input devices 42, one or more communication units 44, one or more output devices 46, and one or more storage devices 48. Each of components 4, 40, 42, 44, 46 and 48 may be interconnected (physically, communicatively, and/or operatively) by communication channels 50 for inter-component communications. In some examples, communication channels 50 may include a system bus, a network connection, an inter-process communication data structure, or any other channel for communicating data.

Processors 40, in one example, are configured to implement functionality and/or process instructions for execution within computing device 2. For example, processors 40 may be capable of processing instructions stored in storage device 48. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store program code and/or data for use within computing device 2 during operation. In the example of FIG. 2, storage devices 48 store software components including operating system 54, UI module 6, input module 8, user management module 10, and application modules 12A-12N. Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when the computer is turned off. Examples of volatile memories include random access memories (RAM), dynamic random access memories (DRAM), static random access memories (SRAM), and other forms of volatile memories.

In some examples, storage device 48 is used to store program instructions for execution by processors 40. Storage device 48, in one example, is used by software or applications running on computing device 2 (e.g., applications 12) to temporarily store information during program execution. Storage devices 48, in some examples, comprise one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 44. Computing device 2, in one example, utilizes communication units 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G, and WiFi radios computing devices as well as Universal Serial Bus (USB). In some examples, computing device 2 utilizes communication unit 44 to wirelessly communicate with another computing device that is operably coupled to computing device 2.

Computing device 2, in one example, also includes one or more input devices 42. Input device 42, in some examples, is configured to receive input from a user through tactile, audio, or video feedback. Examples of input device 42 include a presence-sensitive display, a mouse, a keyboard, a voice responsive system, video camera, microphone or any other type of device for detecting a command from a user. In some examples, a presence-sensitive display includes a touch-sensitive screen.

One or more output devices 46 may also be included in computing device 2. Output device 46, in some examples, is configured to provide output to a user using tactile, audio, or video stimuli. Output device 46, in one example, includes a sound card, a video graphics adapter card, optical projector, a presence-sensitive display, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user.

Operating system 54, in some examples, controls the operation of components of computing device 2. For example, operating system 54, in one example, facilitates the communication of user management module 10 with processors 40, communication units 44, storage device 48, input device 42, and output device 46. One or more components of storage devices 48, including user management module 10 and applications 12, may each include program instructions and/or data that may be executable by computing device 2. In some instances, at least a portion of the functionality of one or more of UI module 6, input module 8, and user management module 10 may be implemented within and/or performed by operating system 54.

User management module 10 may include various software modules or components, such as homescreen module 56 and wallpaper module 58 that operate in accordance with the techniques described herein. As one example, user management module 10 may include instructions that cause computing device 2 to perform one or more of the operations and actions described in the present disclosure. In some examples, one or more of the components illustrated in storage device 48 may be implemented in hardware and/or a combination of software and hardware.

Storage device(s) 48 may store user profile data 60. In some examples, user profile data 60 includes data associated with one or more user profiles for use by one or modules of computing device 2, such as user management module 10. Storage device(s) 48 may also store wallpaper data repository 62. In some examples, wallpaper data repository 62 includes data associated with one or more different wallpaper designs for use by one or modules of computing device 2, such as user management module 10.

Homescreen module 56 may provide a variety of functionalities. For example, homescreen module 56 may instruct computing device 2 to display at a display screen, such as UI device 4, a homescreen page. The homescreen page may include graphical elements, such as icons that are interactive (e.g., touch-targets on a touch screen), that correspond to the one or more user profiles that are established on computing device 2, such as icons 30, 32 of FIG. 1. In some examples, each graphical element is associated with a particular user profile and contains identifying information for the particular user profile. The identifying information may include a unique name and/or picture associated with the user profile. In another example, the graphical element may display a portion of wallpaper pattern assigned to the user profile. The homescreen page may be displayed, for example, when no user profile is logged in at computing device 2.

In another example, homescreen module 56 creates a new user profile or profile. When a new user profile is being established, for example, homescreen module 56 may request a wallpaper assignment for the new user profile from wallpaper module 58. Wallpaper module 58 may access wallpaper data repository 62, which may include data associated with multiple different wallpapers. Each wallpaper may be a graphical image that can be used as a background image for a display screen. In response to receiving the request from homescreen module 56, wallpaper module 58 selects a wallpaper that is not associated with any other established user profiles. For example, wallpaper module 58 may consult stored information that indicates a user profile to which each stored wallpaper is assigned, and select a wallpaper that is not yet assigned to a user profile. For example, information regarding which, if any, user profile is assigned to each wallpaper may be stored in wallpaper data repository 62, and/or in user profile data 60. Wallpaper module 58 provides identifying information of the selected wallpaper, such as a file name and file path, to homescreen module 56. Homescreen module 56 associates the selected wallpaper with the new user profile, such as by updating wallpaper data repository 62 and/or user profile data 60.

Wallpaper module 58 manages wallpapers for computing device 2. Wallpaper module 58 may select a wallpaper in a number of ways. For example, a set of wallpapers may be accessible to wallpaper module 58, such as stored in wallpaper data repository 62. In some examples, the set of wallpapers is listed in a particular order. Wallpaper module 58 may assign the wallpapers to new user profiles in the same order. That is, the next unused wallpaper in the list of wallpapers of wallpaper data repository 62 may be selected for the next user profile. In another example, wallpaper module 58 may randomly choose the wallpaper, or by some other metric, from those wallpapers that are not currently assigned to other user profiles.

Wallpaper module 58 may determine which wallpapers in the set of wallpapers are already assigned to previously existing user profiles. Wallpaper module 58 then selects a wallpaper from the subset of unused wallpapers. Wallpaper module 58 is able to determine which wallpapers are used for the multiple users. Wallpaper module 58 may specify the name of the wallpaper chosen for a particular user profile.

In another example, when homepage module 56 is used to establish a new user profile, homepage module 56 selects a wallpaper and then queries wallpaper module 58 to determine if another user profile is using the selected wallpaper. Homepage module 56 may proceed through a list of wallpapers until it is determining that a particular wallpaper is not associated with any other user profile.

According to techniques described herein, a wallpaper from a stock of unassigned wallpapers may be automatically assigned to a newly created user profile. When a new user profile is added to computing device 2, wallpaper module 58 chooses a wallpaper from the stock of unassigned wallpapers. In this manner, wallpaper module 58 and homepage module 56 can automatically assign to a new user profile a wallpaper that is unique across computing device 2. By assigning a unique wallpaper to each user profile, the wallpaper displayed at the lock screen may be used to determine which user profile is the currently selected user profile. In another example, wallpaper module 58 can download the stock of wallpapers from storage at a remote location (e.g., via communication unit 44). In one example, wallpaper module 58 can display a set of unused wallpaper options, and computing device 2 can receive a user selection from among the set via UI device 4.

In accordance with the techniques of this disclosure, computing device 2 may output, for display at UI device 4 and/or output device 46, a lock screen GUI. The lock screen GUI may include at least a first graphical element and a second graphical element. The first graphical element may comprise information that identifies a first user profile of computing device 2. The second graphical element may comprise information that identifies a second user profile of computing device 2. Input device 42 may receive an indication of a first user input. The first user input may correspond to a user selection of a user profile. In some examples, one or more of input devices 42 may send data representing the first user input to user management module 10.

In response to receiving the data representing the first user input, user management module 10 may determine which user profile was selected by the user. In some examples, user management module 10 may determine which profile was selected by the user by comparing the data received from input device 42 with user data stored by user profile data 60. For example, user management module 10 may compare image data received from input device 42 with an image stored by user profile data 60 to determine whether the received image data corresponds with the stored image data. In other examples, user management module 10 may determine which user profile was selected by comparing the data received from input device 42 with data representing the positions of the graphical elements at output device 46.

In response to determining which user profile was selected by the user, user management module 10 may cause output device 46 to output the lock screen GUI such that the lock screen GUI further includes a wallpaper associated with the determined user profile. In some examples, in response to determining which user profile was selected by the user, user management module 10 may cause output device 46 to output the lock screen GUI such that the lock screen GUI further includes one or more widgets associated with the determined user profile.

Although shown in FIG. 2 as a stand-alone computing device 2 for purposes of example, a computing-device may be any component or system that includes a processor 40 or other suitable computing environment for executing software instructions and, for example, need not include user interface device 4.

As described above, in some examples, computing device 2 may output graphical content for display at a presence-sensitive display that is coupled to computing device 2 by a system bus or other suitable communication channel. Computing device 2 may also output graphical content for display at one or more remote devices (not shown), such as a projector, projector screen, tablet device, and visual display device. For instance, computing device 2 may execute one or more instructions to generate and/or modify graphical content in accordance with techniques of the present disclosure. Computing device 2 may output the data that includes the graphical content to a communication unit of computing device 2, such as a communication unit. The communication unit may send the data to one or more of the remote devices, such as a projector, a projector screen, a tablet device, and/or a visual display device. In this way, computing device 2 may output the graphical content for display at one or more of the remote devices. In some examples, one or more of the remote devices may output the graphical content at a presence-sensitive display that is included in and/or operatively coupled to the respective remote devices.

In some examples, computing device 2 may not output graphical content at a presence-sensitive display that is operatively coupled to computing device 2. In other examples, computing device 2 may output graphical content for display at both a presence-sensitive display that is coupled to computing device 2 by a communication channel, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 2 and output for display at the presence-sensitive display may be different than graphical content display output for display at one or more remote devices.

Computing device 2 may send and receive data using any suitable communication techniques. For example, computing device 2 may be operatively coupled to an external network using a network link. Remote devices may be operatively coupled to the external network by respective network links. The external network may include network hubs, network switches, network routers, etc., that are operatively intercoupled thereby providing for the exchange of information between computing device 2 and the remote devices. In some examples, the network links may be Ethernet, ATM or other network connections. Such connections may be wireless and/or wired connections.

In some examples, computing device 2 may be operatively coupled to one or more of the remote devices using direct device communication. Direct device communication may include communications through which computing device 2 sends and receives data directly with a remote device, using wired or wireless communication. That is, in some examples of direct device communication, data sent by computing device 2 may not be forwarded by one or more additional devices before being received at the remote device, and viceversa. Examples of direct device communication may include Bluetooth, Near-Field Communication, Universal Serial Bus, WiFi, infrared, etc. One or more of the remote devices may be operatively coupled with computing device 2 by communication links. In some examples, the communication links may be connections using Bluetooth, Near-Field Communication, Universal Serial Bus, infrared, etc. Such connections may be wireless and/or wired connections.

Figure 3:
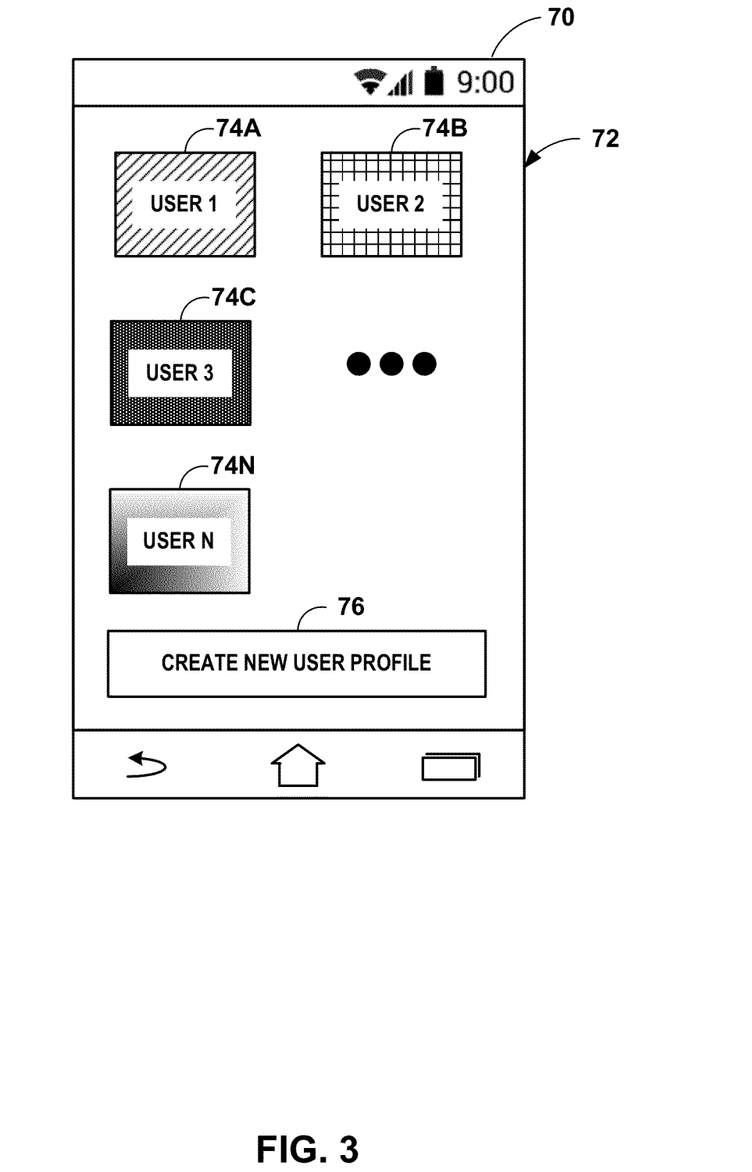
FIG. 3 is a conceptual diagram illustrating an example user interface for a homepage of a mobile computing device having multiple user accounts, in accordance with one or more aspects of the present disclosure.

FIG. 3 is a conceptual diagram illustrating an example GUI 70 for a homepage 72 of a mobile computing device having multiple user profiles, in accordance with one or more aspects of the present disclosure. Several graphical elements 74A through 74N (collectively, "graphical elements 74") are included on homepage 72. A graphical element may be an element by which a user may interact with computing device 2. Each graphical element 74 is associated with a particular, different user profile. Each graphical element 74 includes identifying information for the particular associated user profile. In the example shown in FIG. 3, each graphical element 74 includes at least a portion of a unique wallpaper associated with the user profile. GUI 70 further includes a graphical element 76 by which a user may interact with computing device 2 to begin creation of a new user profile.

Homepage 72 presents options from which a user selection of a user profile can be received. For example, if the lock screen GUI 14 of FIG. 1 shows a currently selected user profile other than a user profile to which the present user of computing device 2 wishes to log in, in some examples the user can move to homepage 72 to select a different user profile previously created on computing device 2, or to create an additional new user profile.

In other examples, each wallpaper may be associated with a unique sound or set of sounds, and when the lock screen is initially displayed, computing device 2 outputs the unique sound in addition to displaying the wallpaper. For example, the set of sounds may be a song, phrase, chime, drumbeat, or other set of sounds. In some examples, computing device 2 may associate a unique sound with each user profile, rather than associating the sound with the wallpaper. This feature enables a user to further distinguish between the user profiles, and may be particularly useful if a user is visually impaired, for example.

Figure 4:
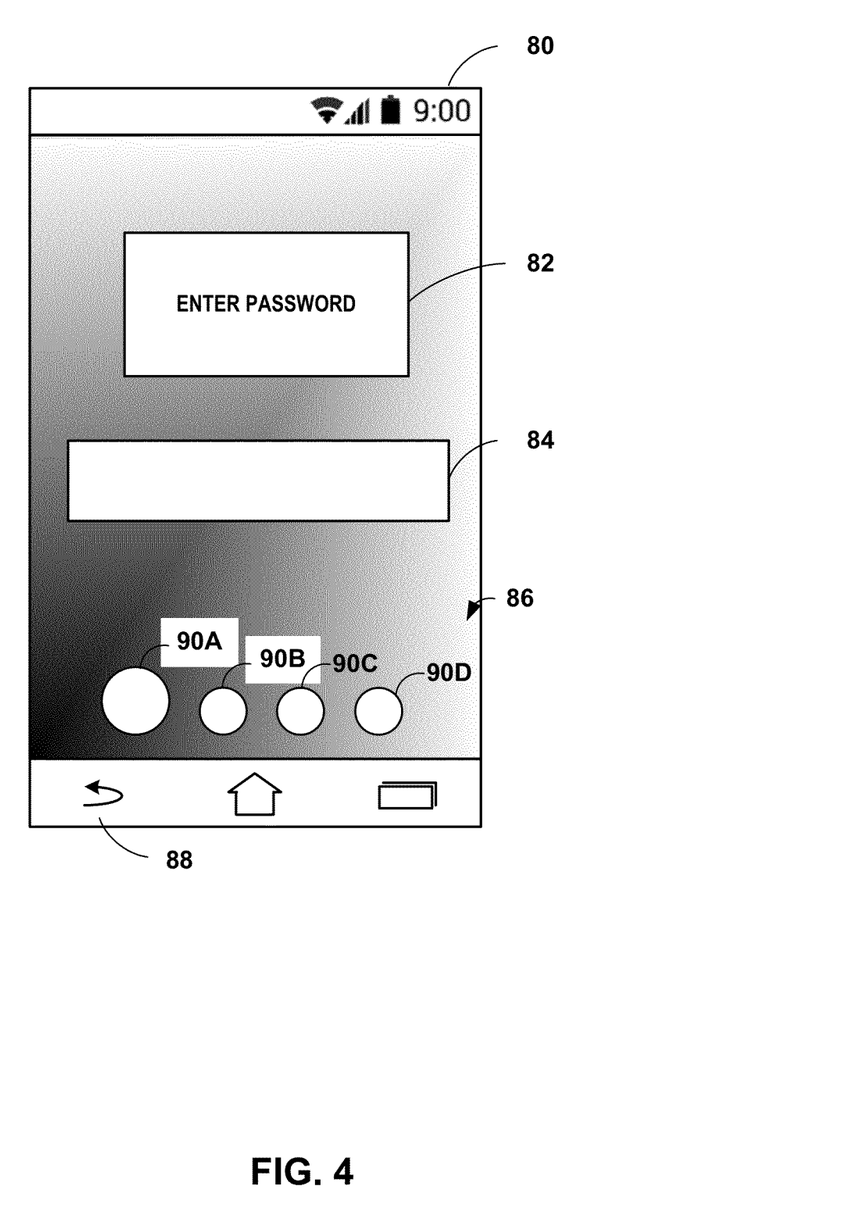
FIG. 4 is a conceptual diagram illustrating another example user interface for a lock screen, in accordance with one or more aspects of the present disclosure.

FIG. 4 is a conceptual diagram illustrating another example user interface 80 for a lock screen, in accordance with one or more aspects of the present disclosure. In this example, computing device 2 detects a user input selecting graphical element 74N at homepage 72 of FIG. 3. Responsive to detecting the user input selecting graphical element 74N, computing device 2 outputs for display the lock screen for the user profile associated with graphical element 74N. In the example of FIG. 4, the lock screen includes an instruction 82 to enter a password that may be authenticated as log-in information. The lock screen further includes, at least in this example, a field 84 for receiving user input of the log-in information, such as a password. The lock screen also includes a set of profile identification elements 90A-90D ("profile identification elements 90"), which are each associated with a different user profile previously created on computing device 2. In some examples, profile identification elements 90 may each be displayed as a different color, and/or may include text specifying a user name associated with each respective user profile. Profile identification elements 90 may be used for navigating between different lock screens associated with the different user profiles.

In the example of FIG. 4, UI device 4 of computing device 2 outputs wallpaper 86 assigned to the user profile associated with graphical element 74N, as a background portion of user interface 80 when displaying the lock screen. In this example, wallpaper 86 is used only for the user profile associated with graphical element 74N and is not associated with any other user profile. Displaying a unique wallpaper can make it easier to quickly determine which user profile will be unlocked upon providing the correct credentials at the lock screen. Thus, if a user can recognize the wallpaper associated with her account, the user can quickly determine if entering credentials at the lock screen will unlock her account.

The computing device may further include a button 88. In some examples, button 88 is a graphical element of user interface 80. In other examples, button 88 is a physical button of computing device 2. In some aspects, when computing device 2 detects user input selecting button 88, computing device 2 may leave the lock screen and return to a homepage, such as homepage 72 of FIG. 3. A user may interact with button 88 when the user recognizes that wallpaper 86 is the incorrect wallpaper for the user profile for which the user wishes to log in. Alternatively, if the user does not recognize the wallpaper as being associated with her account, in some examples the user can select the appropriate one of profile identification elements 90 to change to the lock screen and wallpaper associated with her account, without having to first return to homepage 72.

Each user profile may have a different authentication method selected to use for unlocking computing device 2. For example, user profiles may be associated with a facial recognition or other biometric authentication login, a password login, a gesture login, or other authentication methods. When computing device 2 displays the lock screen GUI associated with a selected user profile, computing device 2 displays a lock screen having the mode of authentication configured for that user profile, or a default mode of authentication if none has been selected.

Figure 5:
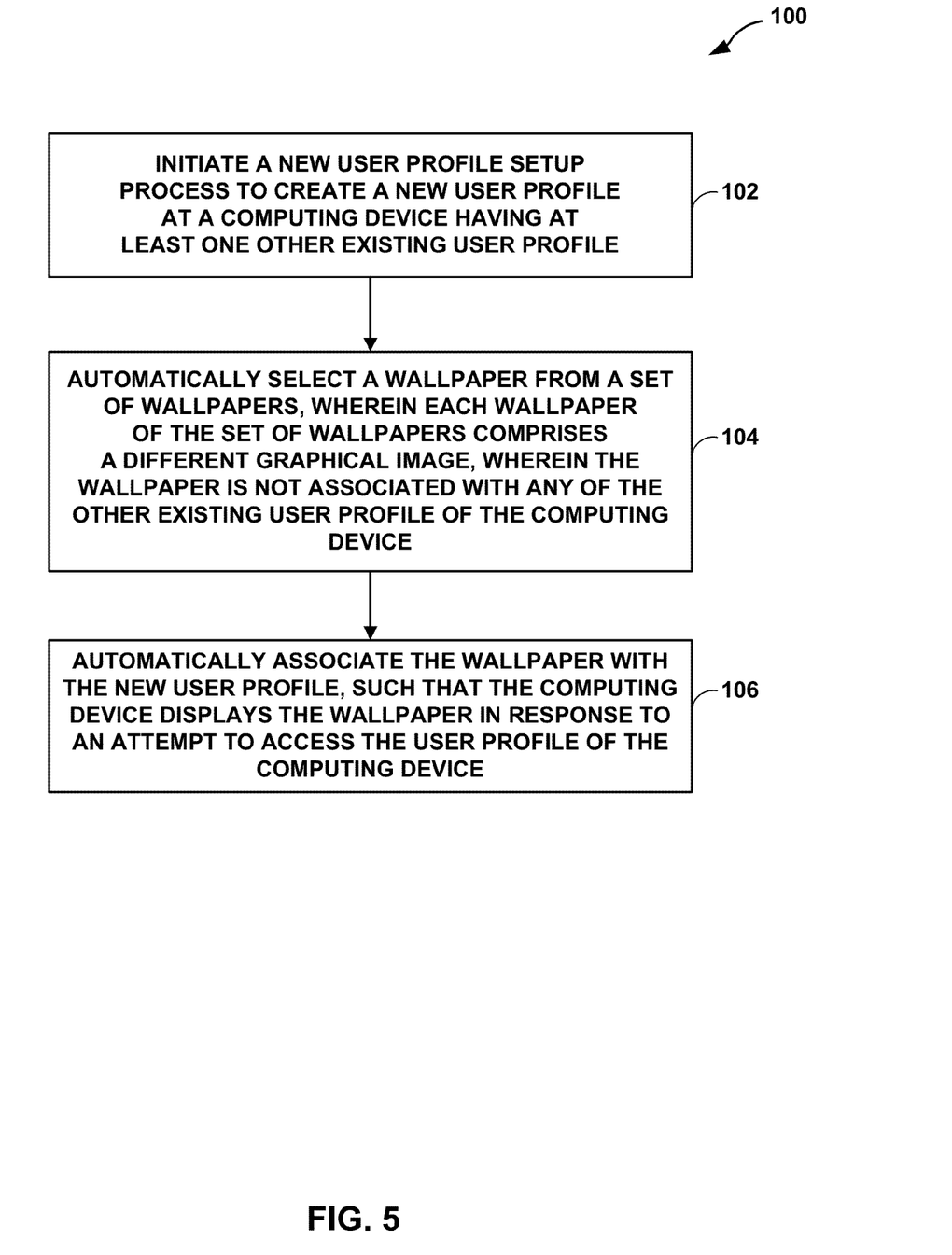
FIG. 5 is a flowchart illustrating example operation of a computing device for assigning a unique wallpaper to a new user profile, in accordance with one or more aspects of the present disclosure.

FIG. 5 is a flowchart illustrating example operation of a computing device for assigning a unique wallpaper to a new user profile, in accordance with one or more aspects of the present disclosure. For purposes of illustration only, the example operations are described below within the context of computing device 2, as shown in FIGS. 1 and 2. FIG. 5 illustrates a process 100 for the example operation of a computing device for assigning a unique wallpaper to a new user profile.

Process 100 comprises generating, initiating, by a computing device, such as computing device 2, a new user profile setup process to create a new user profile at computing device 2, computing device 2 having at least one other existing user profile (102). For example, homescreen module 56 of user management module 10 may initiate the new user profile setup process to create the new user profile at computing device 2. In some examples, computing device 2 is a mobile computing device with two or more other user profiles.

Prior to the computing device completing the user profile setup process, process 100 further comprises automatically selecting, by the computing device, a wallpaper from a set of two or more wallpapers, wherein each wallpaper of the set of two or more wallpapers comprises a different graphical image, and wherein the wallpaper is not associated with any of the other user profiles of the computing device (104). For example, homescreen module 56 may request a wallpaper assignment for the new user profile from wallpaper module 58, and wallpaper module 58 may access wallpaper data repository 62, which may include data associated with multiple different wallpapers. The set of two or more wallpapers may be stored at computing device 2 or accessible by computing device 2, such as at wallpaper data repository 62. Each wallpaper is visually distinct from every other wallpaper in the set of two or more wallpapers.

Process 100 also includes automatically associating the wallpaper with the new user profile, such that the computing device displays the wallpaper in response to an attempt to access the user profile of the computing device (106). For example, homescreen module 56 may associate the selected wallpaper with the new user profile. The selected wallpaper is unique to the new user profile. Each of the two or more other user profiles is associated with a different wallpaper of the set of two or more wallpapers. In some examples, wallpaper module 8 determines which wallpapers, from the set of two or more wallpapers, are not associated with the other user profiles. In some examples, selecting the wallpaper from the set of two or more wallpapers further comprises selecting the wallpaper from the wallpapers that are determined to not be associated with the other user profiles.

In other examples, process 100 further comprises outputting, by the computing device and for display, at least a portion of the wallpaper while computing device 2 is outputting a log-in option for the new user profile. For example, computing device 2 may output for display at a UI device 4, at least a portion of the wallpaper while computing device 2 is outputting a log-in option for the new user profile.

In another example, process 100 further comprises outputting, by the computing device for display at a display screen, a lock screen user interface that includes a plurality of graphical elements, each of the graphical elements being associated with a different user profile of the computing device. For example, computing device 2 may output the lock screen user interface for display at UI device 4. Process 100 may further include receiving, by the computing device, an indication of user input corresponding to a selection of a particular graphical element in the plurality of graphical elements. In response to receiving the user input corresponding to the selection of the particular graphical element associated with a selected user profile, process 100 also includes modifying, by a computing device, a lock screen user interface such that a background of the lock screen user interface comprises a wallpaper assigned to the selected user profile of the computing device associated with the particular graphical element. For example, homescreen module 56 may modify the lock screen user interface to include the wallpaper assigned to the selected user profile.

In a further example, wherein the indication of user input is a first indication of user input, process 100 may further comprise receiving, by computing device 2 at the lock screen user interface, an authentication input associated with the selected user profile. Process 100 may also include n response to receiving the authentication input associated with the selected user input, transitioning, by computing device 2, from a limited access state to an access state associated with the selected user profile, wherein the access state enables a set of functionality of the computing device associated with the selected user profile. Computing device 2 may determine that no user input has been received at the computing device within a timeout period. In response to determining that no user input has been received within the timeout period, process 100 further includes transitioning, by the computing device, the computing device from the access state to the limited access state in which at least some of the set of the functionality is disabled. If computing device 2 receives a second indication of user input, in response, computing device 2 may output, and for display, the lock screen user interface that has a background of at least a portion of the wallpaper associated with the selected user profile.

In another example, wherein the authentication input is a first authentication input, process 100 further comprises receiving, by computing device, an indication of a second authentication input detected at the lock screen user interface. In response to receiving the second authentication input, process 100 may include transitioning, by the computing device, from the limited access state to the access state associated with the selected user profile, wherein the access state associated with the selected user profile enables the set of functionality of the computing device associated with the selected user profile.

In another example, computing device 2 determines that no user input has been received within a timeout period. In response computing device 2 outputs for display, a user interface that includes a background corresponding to a wallpaper associated with the selected user profile.

In an alternative example, computing device 2 may receive an indication of user input. Computing device 2 generates, in response to receiving the indication of the user input, a new user profile of the computing device. Computing device 2, in response to receiving the indication of the user input, assigns a wallpaper for the new user profile such that the wallpaper for the new user profile is not the same as wallpapers assigned to any other user profile of computing device 2.

Further, wherein the user input is a first user input, computing device 2 may output for display, a lock screen user interface that includes a plurality of graphical elements, each of the graphical elements being associated with a different user profile of the computing device. Computing device 2 receives an indication of a second user input. Computing device 2 determines that the second user input corresponds to a selection of a particular graphical element in the plurality of graphical elements. Responsive to determining that the second user input corresponds to the selection of the particular graphical element associated with a selected user profile, modifying, by computing device 2, the lock screen user interface such that a background of the lock screen user interface comprises a wallpaper assigned to the selected user profile of computing device 2 associated with the particular graphical element.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

The invention claimed is:

1. A method, comprising:
   initiating, by a computing device, a new user profile setup process to create a user profile at the computing device, the computing device having at least one other existing user profile; and
   prior to the computing device completing the new user profile setup process:
   selecting, by the computing device, a wallpaper from a set of two or more wallpapers, wherein each wallpaper of the set of two or more wallpapers comprises a different graphical image, wherein the selected wallpaper is not associated with any other existing user profile of the computing device; and
   automatically associating the wallpaper with the user profile, such that the computing device displays the wallpaper in response to an attempt to access the user profile of the computing device; and
   in response to receiving an indication of a user input corresponding to a selection of a particular graphical element associated with a selected user profile, modifying, by the computing device, a lock screen user interface such that a background of the lock screen user interface comprises a wallpaper assigned to the selected user profile of the computing device associated with the particular graphical element.

2. The method of claim 1, further comprising:
   outputting, by the computing device and for display, at least a portion of the wallpaper concurrently with outputting a lock screen for the new user profile.

3. The method of claim 1, further comprising:
   outputting, by the computing device and for display, the lock screen user interface that includes a plurality of graphical elements, each of the graphical elements being associated with a different user profile of the computing device;
   receiving, by the computing device, the indication of user input corresponding to the selection of the particular graphical element in the plurality of graphical elements.

4. The method of claim 1, wherein the indication of user input is a first indication of user input, further comprising:
   receiving, by the computing device at the lock screen user interface, an authentication input associated with the selected user profile; and
   in response to receiving the authentication input associated with the selected user input, transitioning, by the computing device, from a limited access state to an access state associated with the selected user profile, wherein the access state associated with the selected user profile enables a set of functionality of the computing device associated with the selected user profile.

5. The method of claim 4, further comprising:
   in response to determining that no user input has been received within the timeout period, transitioning, by the computing device, from the access state to the limited access state in which at least some of the set of the functionality is disabled;
   receiving, by the computing device, a second indication of user input; and
   in response to receiving the second indication of user input, outputting, by the computing device and for display, the lock screen user interface that includes the wallpaper associated with the selected user profile.

6. The method of claim 5, wherein the authentication input is a first authentication input, further comprising:
   receiving, by the computing device, an indication of a second authentication input detected at the lock screen user interface; and
   in response to receiving the second authentication input associated with the selected user input, transitioning, by the computing device, from the limited access state to the access state associated with the selected user profile, wherein the access state associated with the selected user profile enables the set of functionality of the computing device associated with the selected user profile.

7. The method of claim 1, wherein the wallpaper is unique to the new user profile.

8. The method of claim 1, wherein the computing device is a mobile computing device with two or more other existing user profiles, and wherein each of the two or more other existing user profiles is associated with a different wallpaper of the set of two or more wallpapers.

9. The method of claim 1, wherein the set of two or more wallpapers is stored at the computing device, and wherein each wallpaper is visually distinct from every other wallpaper in the set of two or more wallpapers.

10. The method of claim 1, further comprising:
    determining that the selected wallpaper is not associated with the other existing user profiles,
    wherein selecting the wallpaper comprises selecting based at least in part on the determining.

11. The method of claim 1, further comprising:
    determining, by the computing device, that no user input has been received at the computing device within a timeout period; and
    in response to determining that no user input has been received at the computing device within the timeout period, outputting, by the computing device for display at a display screen, a lock screen, wherein the lock screen includes a wallpaper associated with a previously selected user profile.

12. The method of claim 1, wherein selecting the wallpaper from the set comprises selecting the wallpaper in response to receiving an indication of a user input corresponding to a selection of the selected wallpaper from the set of two or more wallpapers.

13. A computing device comprising:
one or more processors, wherein the one or more processors are configured to cause the computing device to:
initiate, by the computing device, a new user profile setup process to create a new user profile at the computing device, the computing device having at least one other existing user profile;
prior to the computing device completing the new user profile setup process:
select, by the computing device, a wallpaper from a set of two or more wallpapers, wherein each wallpaper of the set of two or more wallpapers comprises a different graphical image, wherein the wallpaper is not associated with any of the other existing user profiles of the computing device; and
automatically associate the wallpaper with the new user profile, such that the computing device displays the wallpaper in response to an attempt to access the user profile of the computing device; and
in response to receiving an indication of a user input corresponding to a selection of a particular graphical element associated with a selected user profile, modifying, by the computing device, a lock screen user interface such that a background of the lock screen user interface comprises a wallpaper assigned to the selected user profile of the computing device associated with the particular graphical element.

14. The computing device of claim 13, wherein the one or more processors are further configured to cause the computing device to:
output, by the computing device and for display, at least a portion of the wallpaper while the computing device is outputting a log-in option for the new user profile.

15. The computing device of claim 13, wherein the computing device comprises a mobile device configured with two or more other existing user profiles, and wherein each of the two or more other existing user profiles is associated with a different, visually distinct wallpaper of the set of two or more wallpapers.

16. The computing device of claim 13, wherein the one or more processors are further configured to cause the computing device to:
output, by the computing device and for display, the lock screen user interface that includes a plurality of graphical elements, each of the graphical elements being associated with a different user profile of the computing device;
receive, by the computing device, the indication of user input corresponding to the selection of the particular graphical element in the plurality of graphical elements.

17. The computing device of claim 13, wherein the one or more processors are further configured to cause the computing device to:
receive at the lock screen user interface, an authentication input associated with the selected user profile;
in response to receiving the authentication input associated with the selected user input, transition from a limited access state to an access state associated with the selected user profile, wherein the mode enables a set of functionality of the computing device associated with the selected user profile;
determine that no user input has been received at the computing device within a timeout period;
in response to determining that no user input has been received within the timeout period, transition from the access state to the limited access state in which at least some of set of the functionality is disabled;
receive a second indication of user input; and
in response to receiving the second indication of user input, output, by the computing device and for display, the lock screen user interface that has a background of at least a portion of the wallpaper associated with the selected user profile.

18. The computing device of claim 13, wherein the one or more processors are further configured to cause the computing device to select the wallpaper in response to receiving an indication of a user input corresponding to a selection of the selected wallpaper from the set of two or more wallpapers.

19. A non-transitory computer-readable storage medium encoded with instructions that, when executed, cause one or more processors of a computing device to:
initiate, by the computing device, a new user profile setup process to create a new user profile at the computing device, the computing device having at least one other existing user profile; and
prior to the computing device completing the new user profile setup process:
select, by the computing device, a wallpaper from a set of two or more wallpapers, wherein each wallpaper of the set of two or more wallpapers comprises a different graphical image, wherein the wallpaper is not associated with any of the other existing user profiles of the computing device; and
automatically associate the wallpaper with the new user profile, such that the computing device displays the wallpaper in response to an attempt to access the user profile of the computing device; and
in response to receiving an indication of a user input corresponding to a selection of a particular graphical element associated with a selected user profile, modifying, by the computing device, a lock screen user interface such that a background of the lock screen user interface comprises a wallpaper assigned to the selected user profile of the computing device associated with the particular graphical element.

20. The computer-readable storage medium of claim 19, wherein the instructions further cause the one or more processors of the computing device to:
output, by the computing device for display at a display screen, a lock screen user interface that includes a plurality of graphical elements, each of the graphical elements being associated with a different user profile of the computing device;
receive, by the computing device, the indication of a user input;
determine, by the computing device, that the second user input corresponds to the selection of the particular graphical element in the plurality of graphical elements.

* * * * *